United States Patent [19]
Myeress

[11] 3,911,589
[45] Oct. 14, 1975

[54] ADJUSTABLE SUPPORT BASE FOR A FIELD MEASUREMENT DEVICE

[75] Inventor: Rudolph Myeress, Richmond Heights, Ohio

[73] Assignee: Allied Steel & Tractor Products, Incorporated, Cleveland, Ohio

[22] Filed: Dec. 19, 1973

[21] Appl. No.: 426,206

[52] U.S. Cl. .................. 33/286; 33/292; 33/295; 33/299; 248/127
[51] Int. Cl.² ............... G01C 15/08; F16M 11/00
[58] Field of Search ............ 33/295, 293, 286, 290, 33/292, 299; 248/163, 121, 122, 124, 127

[56] References Cited
UNITED STATES PATENTS

| | | | |
|---|---|---|---|
| 3,185,416 | 5/1965 | Osinski | 248/121 |
| 3,279,070 | 10/1966 | Blount et al. | 33/1 H |
| 3,685,162 | 8/1972 | Haun | 33/295 |
| 3,737,137 | 6/1973 | Sheehan | 248/121 |

FOREIGN PATENTS OR APPLICATIONS

| | | | |
|---|---|---|---|
| 1,044,597 | 11/1958 | Germany | 355/55 |

Primary Examiner—Richard E. Aegerter
Assistant Examiner—Steven L. Stephan
Attorney, Agent, or Firm—Lyon & Lyon

[57] ABSTRACT

A base for supporting a field measurement device such as a light beam generator used in tunnel and pipeline construction and the like. The support base includes a horizontal frame which may be adjusted to a level position. The frame provides a vertical passageway through the center thereof and a pivotally mounted vertical rod adjacent the vertical passageway. An offset assembly allows the attachment of a standard calibrated surveying rod to said vertical rod in a parallel position through the vertical passageway. A light beam generator or other field measurement device may then be positioned to the standard, calibrated surveying rod either above or below the frame. Pivotal adjustment of the field measurement device about a vertical axis may then be effected by manipulating the vertical rod relative to the established frame.

1 Claim, 5 Drawing Figures

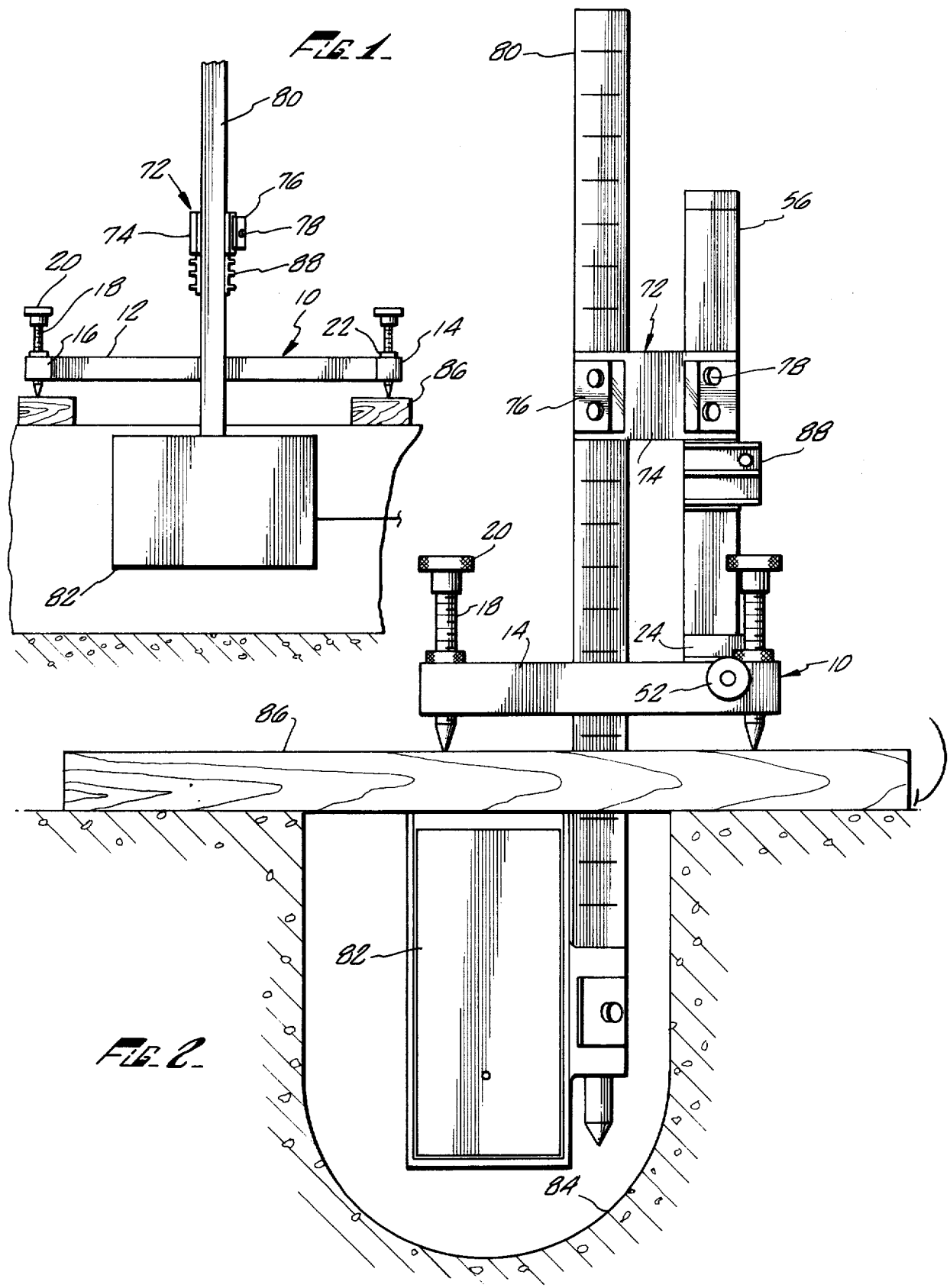

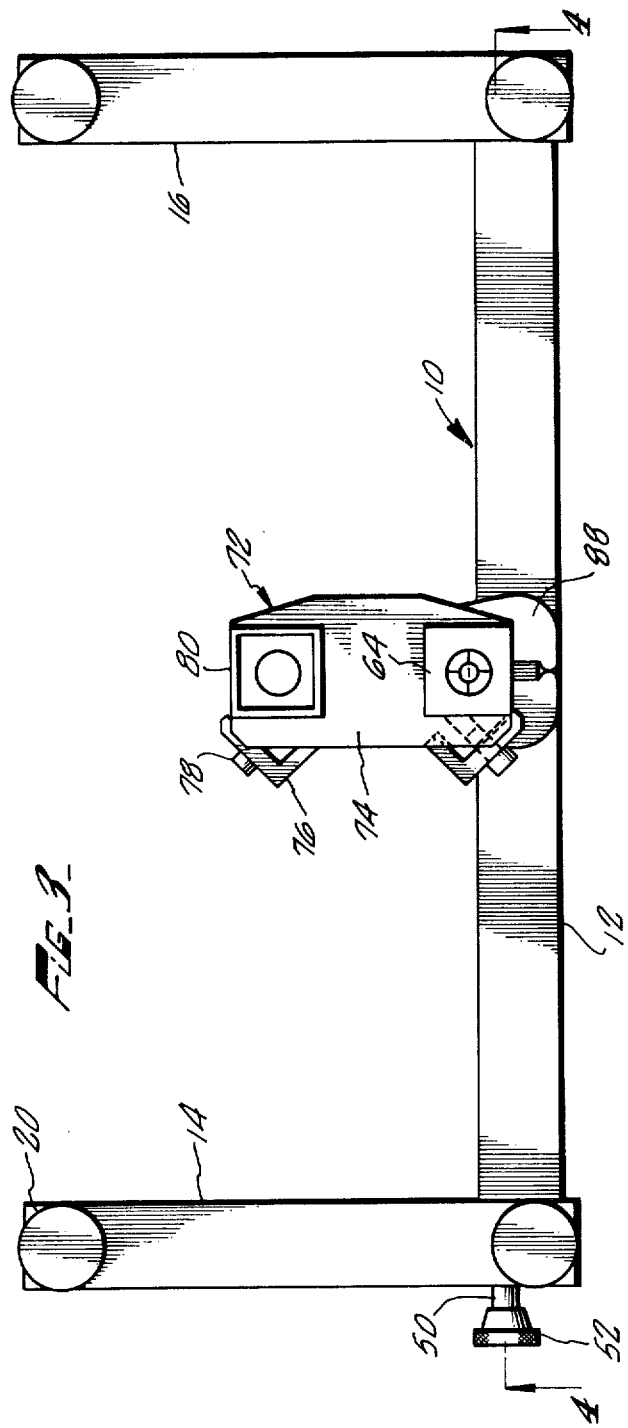
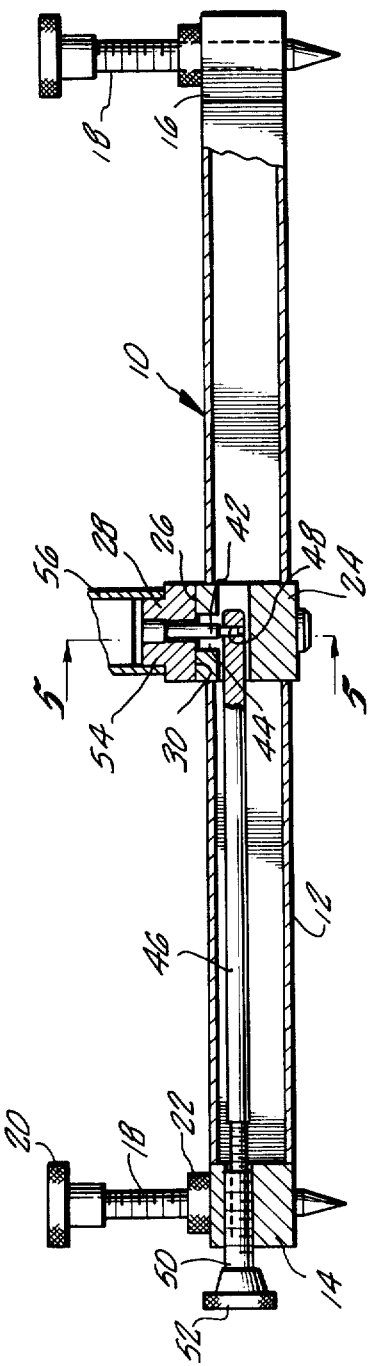
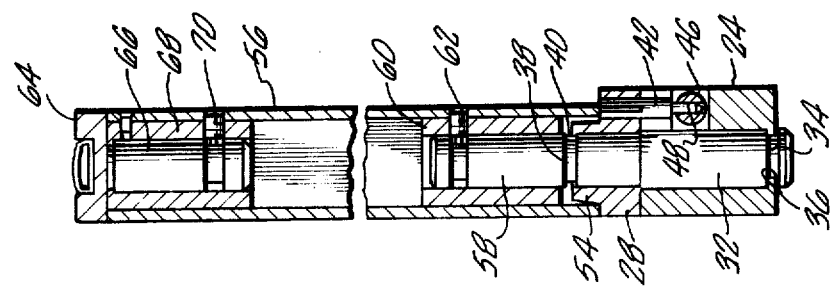

ADJUSTABLE SUPPORT BASE FOR A FIELD MEASUREMENT DEVICE

This invention is directed to a support system for field measurement devices. More specifically, the present invention is directed to a support structure for vertically orienting a field measurement device and allowing small azimuth adjustments in the support.

During construction of pipeline systems, tunnels and the like, it has been found that a light beam generator provides a convenient and useful measuring tool. The light beam generator is located at one end of a straight section in the construction project. The beam may then be directed in a specific direction to indicate trench or pipe placement along the entire length of the straight construction segment. The advent of practical laser equipment has further enhanced this technique. Once established, the laser beam generator can produce a reference beam which extends for a considerable distance.

Certain detrimental features have heretofore existed in the measuring techniques using such light beam generators. Specifically, provision must be made at the construction site for positioning and controlling the laser generating equipment. Consequently, the trench or pipe system must be altered specifically in order that the equipment may be properly located and controlled. Further, a firm support must be established for supporting the laser in order that the reference will be maintained.

Conventional transit tripods have been employed as well as other conventional techniques to support the laser equipment. Laser equipment is also mounted directly to surveying rods wherein the end of the surveying rod forms the support for the equipment. In such practice, a construction worker must remain to hold the rod in the upright position, or again, a tripod or brace must be employed.

The present invention employs a frame structure having a broad base upon which to mount the laser equipment with stability. The frame may be conveniently positioned across the top of any trench or piping system. Consequently, there is no need to excavate the construction site specifically for placement and operation of the laser equipment. Further, the frame may be leveled to provide a vertical reference for the laser equipment which will be maintained until the entire assembly is disturbed.

The mounting structure associated with the frame of the support is capable of pivoting relative to the frame in order that azimuth control of the laser is maintained above the excavation in which the laser generating equipment is placed. Further, the mounting assembly is designed to receive a standardized, calibrated surveying rod to which the laser equipment may be positioned in a conventional manner. It is not required that the surveying rod support the weight of the laser on its lower end. Rather, the frame supports the laser from above on a broad base. Consequently, it is not necessary to develop an extremely stable base for supporting the laser equipment. The inherent stability of the frame is sufficient. This support base with its adjustable azimuth capabilities has also been found useful for the support of other measurement devices. Standard calibrated surveying rods are used to support targets, small telescopes and the like. This system will operate to provide support for these other uses.

Accordingly, it is an object of the present invention to provide a support base having an adjustable azimuth for field measurement devices.

It is another object of the present invention to provide an adjustable support base having a stable frame structure capable of being adjusted to provide vertical reference for field measurement equipment.

A further object of the present invention is to provide an adjustable support base which will allow placement of laser equipment within a channel, trench, piping system or the like wherein special provision for placement and operation of the equipment is not necessary.

Other and more detailed objects and advantages of the present invention will appear hereinafter.

FIG. 1 is an elevation of the present invention illustrating the placement of a light beam generator in a trench.

FIG. 2 is an end view of the assembly of FIG. 1.

FIG. 3 is a plan view of the present invention.

FIG. 4 is a cross-sectional elevation taken along line 4—4 of FIG. 3.

FIG. 5 is a cross-sectional elevation of the present invention taken along line 5—5 of FIG. 4.

Turning specifically to the drawings, a frame, generally designated 10, is illustrated as consisting of a cross member 12 and two lateral end members 14 and 16. The cross member 12 is conveniently of square tubing welded to solid rectangular rods which form the lateral end members 14 and 16. The resulting frame 10 generally defines a plane extending over a comparatively wide area to form a stable base structure for the laser generating equipment. The resulting base provides for extreme positions extending laterally from the mounting location thereon. Means are provided to adjustably support the frame 10 at these four extreme lateral positions. These adjustable supports are shown in the present embodiment to include adjustment screws 18 positioned through vertically disposed threaded holes in either end of the lateral end members 14 and 16. The adjustment screws 18 include pointed contacts for stably supporting the frame. At the upper end of each adjustment screw 18, a hand knob 20 is provided for easy adjustment of the adjustable support means. A check nut 22 is also provided with each of the adjustment screws 18. Each check nut 22 acts to lock the adjustment screw 18 in position relative to the frame 12 when the check nut 22 is tightened against the frame 10. The peripheral surfaces of the hand knob 20 and the check nuts 22 are knurled for improved purchase.

The dimensions of the frame 10 are such that for convenience, a light beam generator may be passed between the two lateral end members 14 and 16. This allows placement and removal of the light beam generating equipment or other measurement devices without disturbing the placement of the frame 10. It is also considered advantageous that the center of gravity of the assembled support and light beam generator is positioned so as not to approach a line drawn between the two adjustment screws 18 at the ends of the lateral end members 14 and 16 away from the cross member 12.

Located centrally on the cross member 12, a mounting means is provided for pivotally supporting an attachment member. The mounting means includes a fixed support block 24 which is permanently fixed in a notch provided in the cross member 12. The support block 24 includes a flat, bearing surface 26 horizontally disposed relative to the frame 10. An adjustment block 28 has a corresponding bearing surface 30 and rests above the fixed support block 25 with the bearing surfaces 26 and 30 juxtaposed. Extending through the fixed support block 24 and the adjustment block 28 is a pivot shaft 32. The pivot shaft 32 is vertically disposed relative to the frame 10 and allows relative motion between the adjustment block 28 and the fixed support block 24. A groove 34 in the pivot shaft 32 cooperates with a retaining ring 36 to positively position one end of the pivot shaft 32 relative to the fixed support block 24. A second groove 38 is positioned in the pivot shaft 32 above the adjustment block 28. A retaining ring 40 is employed to prevent movement of the pivot shaft 32 relative to the fixed support block 24 and the adjustment block 28. The two retaining rings 36 and 40 thereby act to retain the fixed support block 24 and the adjustment block together with the pivot shaft 32 positioned therethrough. In this manner, the adjustment block 28 may be pivoted relative to the fixed support block 24 about a fixed axis coincident with the centerline of the pivot shaft 32.

To control the position of the adjustment block 28 relative to the fixed support block 24, adjustment means is provided. The adjustment means includes a block pin 42 securely positioned in the adjustment block 28. The block pin 42 extends downwardly from the adjustment block 28 into a cavity provided on one side of the fixed support block 24. The cavity 44 is large enough to allow substantial motion of the block pin 42 and in turn the adjustment block 28. The block pin 42 is offset from the center of the adjustment block 28 and is disposed in a vertical direction to allow control of the position of the adjustment block 28 about the shaft 32.

To control the adjustment block 28 using the block pin 42, a threaded control rod 46 extends from one side of the frame 10 to the block pin 42. A bored hole 48 is provided in the control rod 46 for receipt of the block pin 42. The orientation of the control rod 46 relative to the block pin 42 and the adjustment block 28 is such that longitudinal motion of the control rod 46 will induce pivotal motion in the block pin 42.

To control the longitudinal motion of the control rod 46, one end thereof is threaded and is caused to engage an adjusting screw 50. The adjusting screw includes a threaded bore for receipt of the threaded end of the control rod 46. Consequently, rotation of the adjusting screw 50 will cause the control rod 46 to move longitudinally relative to the adjusting screw 50. The adjusting screw also includes threads on the exterior of the shank to engage the lateral end member 14. By rotating the adjusting screw 50, the adjusting screw itself will move longitudinally relative to the lateral end member 14. Appropriate selection of thread pitches for both the exterior of the adjusting screw shank and the bore thereof will bring about the desired sensitivity of the adjustment means. The adjusting screw 50 includes a knurled adjusting knob 52 for convenient manual operation. Thus, a system is provided for supporting and controlling the pivotal position of the adjustment block 28.

The adjustment block 28 extends upwardly to provide a boss 54 for receiving a square rod 56. Further, the pivot shaft 32 also extends upwardly to form a male member 58 received by a cylindrical socket 60 set into the base of the square rod 56. The male member 58 and the socket 60 are conveniently of standard dimensions employed with standard, calibrated surveying rods. A set screw 62 retains the rod 56 on the pivot shaft 32 and also retains the socket 60 relative to the square rod 56. By virtue of the placement of the square rod 56 on the square boss 54 associated with the adjustment block 28, the square rod is constrained to pivot about the axis of the pivot shaft 32 and is further constrained by the adjustment system employed to position the adjustment block 28.

The square rod 56 extends upwardly for approximately 12 inches. It has been found that 12 inches is sufficient for most operations. However, where necessary, the square rod 56 may extend upwardly for a greater distance. The square rod 56 conveniently has a cross section which is of the same dimensions as is employed for standard, calibrated surveying rods. In this way, standard clamps may be employed to attach instruments and the like to the adjustable support base. At the upper end of the square rod 56, a conventional level 64 is employed. The level 64 is in the form of an end cap associated with the square rod 56 and having a male member 66 extending into a standard socket 68. A set screw 70 retains both the level 64 and the socket 68 in the square rod 56. The level is most conveniently a circular bubble level which indicates the orientation of the square rod 56 relative to vertical. The adjusting screws 18 may be manipulated until the level 64 indicates that the square rod 56 is in a vertical orientation. A vertical reference is thereby obtained and can be frequently checked during operation of the unit.

To attach field measurement devices to the adjustable support base, an offset clamp assembly, generally designated 72, is provided. The offset clamp assembly includes an offset 78. The offset clamp block includes two rectangular channels extending in parallel orientation therethrough. Each channel is sized to receive a square, calibrated surveying rod. One side of the offset clamp assembly 72 is employed to receive the square rod 56. This creates an established position at the other end of the offset clamp block 74 for receipt of a standard calibrated rod 80. It is advantageous that the offset clamp block 74 and the offset clamp shoes 76 are of sufficient precision that the standard, calibrated rod 80 will be oriented in a parallel manner with respect to the square rod 56. In this way, the reference established by the level 64 will also provide a vertical reference for the standard, calibrated rod 80.

Clamped to the rod 80 by conventional means is a light beam generator 82. The light beam generator is shown in FIG. 2 to be positioned below the offset clamp assembly 72 in a trench 84. Two-by-fours 86 may be employed to span the trench 84 and provide support for the frame 10 through the adjustment screws 18. An adjustable support base is therefore provided which is positioned conveniently above the light beam generator 82 or other field measurement device.

The total adjustment available with the adjustable support base includes the vertical alignment of the standard, calibrated surveying rod 80 through the use of the level 64 and the adjustment screws 18. The azimuth of the light beam generator 82 may also be finally adjusted by means of the adjustment assembly employed with the adjustment block 28. Again, this is accomplished through manipulation of the adjusting screw 50. Finally, a reference elevation may be determined on the square rod 56. Because a standard, calibrated surveying rod 80 is employed to mount the light beam generator 82, the reference elevation located on the square rod 56 may be translated through proper placement of the offset clamp assembly 72 to an elevation for the light beam being generated. Further, these various adjustments and references are performed at a convenient location above the light beam generator 82 and are accomplished on a stable base.

To further aid in the convenient establishment of an elevation reference on the square rod 56, a reference clamp 88 may be employed. The reference clamp 88 is first positioned on the square rod 56 and adjusted to provide a specific elevation at its upper surface. The offset clamp assembly 72 may then be simply set on the reference clamp 88 and tightened about the square rod 56. In this way, accurate vertical location of the light beam generator 82 is accomplished conveniently and expediently.

Thus, an adjustable support base is disclosed which creates a stable base for field measurement devices and provides convenient adjustments for vertical reference, elevation and angular orientation of the light beam generator. While embodiments and applications of this invention have been shown and described, it would be apparent to those skilled in the art that many more modifications are possible without departing from the inventive concepts hereindescribed. The invention, therefore, is not to be restricted except by the spirit of the appended claims.

What is claimed is:

1. An adjustable support base for a field measurement device comprising a frame, said frame extending laterally to four support positions and including a vertical opening through the center thereof to allow placement and removal of a field measurement device below said frame;

means for adjustably supporting said frame at said four support positions;

a support rod pivotally mounted on said frame, said support rod being disposed generally normally to the lateral extensions of said frame and extending from adjacent said vertical opening;

adjustment means for adjusting and retaining the pivotal location of said support rod relative to said frame, said adjustment means including a pin eccentrically mounted relative to the pivot axis of said support rod to pivot with said support rod and a control rod attached at its first end to said pin and operably associated with said frame at its second end in order that said control rod may be moved to effect pivotal movement of said support rod;

an offset assembly for clamping to said support rod at any point along the length of said support rod and providing a clamp for attachment of a standard surveying rod parallel to said support rod such that the standard surveying rod may extend through said vertical opening to support the field measurement device; and means for establishing a vertical reference position in said support rod.

* * * * *